April 28, 1931.  H. JUNKERS  1,802,721

PLANE FOR AIRCRAFT

Filed Dec. 4, 1929

Inventor:
Hugo Junkers
by Kuichauer
Atty.

Patented Apr. 28, 1931

1,802,721

UNITED STATES PATENT OFFICE

HUGO JUNKERS, OF DESSAU, GERMANY

PLANE FOR AIRCRAFT

Application filed December 4, 1929, Serial No. 411,603, and in Germany December 10, 1928.

My invention relates to planes for aircraft, for instance wings, ailerons, stabilizers, elevators, rudders and the like, and more particularly to planes of the kind described which are equipped with a fairing of corrugated sheet metal.

It is an object of my invention to improve a plane of this type, and to this end I provide the plane with a fairing which is only partly corrugated and otherwise plain.

In a preferred embodiment of my invention I provide the corrugated fairing only at the lower face of the plane, and a plain fairing at the upper face.

Taking, for instance, the wing of an airplane in flight, the air forces exert bending stresses on the wing which result in tensile stresses at the lower and in compression stresses at the upper face of the wing. As a rule torsional stress is also exerted on the wing which may result from the action of the ailerons. The torsional forces generate tensile forces which extend diagonally in the fields formed by the spars and the ribs. It is desirable that the fairing of the wing should partake in bracing it against the forces acting on it, and the wing should be so designed that its share of forces is transmitted to and absorbed by the fairing.

Obviously, with a view to eliminating local overloading of the wing, it is desirable to distribute the stresses so that the bracing of the wing, its spars, ribs and other parts, on the one hand, and its fairing on the other, should be strained to substantially the same extent by all the forces acting on them, so that they will break substantially at the same time when the ultimate stress is exceeded. It is, however, very difficult to fulfill this condition and therefore all attempts to absorb the bending forces were given up for wings having corrugated fairing. In fact such wings, with the corrugations extending in the direction of flight and consequently at right angles to the bending forces, yield to the bending forces, while the corrugated fairing is able to absorb substantially all the torsional forces. A wing fitted exclusively with corrugated fairing has the advantage that the action of the forces is more readily understood and calculated than would be the case in a wing designed for the absorption of torsional and bending forces, but it involves the drawback that the fairing of corrugated sheet metal is heavy as compared with plain fairing, and its aerodynamic resistance is considerable.

It has now been found that, without detracting substantially from the strength of a wing, it is possible to partly replace the corrugated fairing by plain fairing. When the fairing of the upper face is replaced partly or throughout in this manner while the lower face is still covered with corrugated fairing, the lower face behaves in the same manner as in a wing with corrugated fairing throughout, that is, it is bent by the tension forces without absorbing tension forces on its lower face while the plain fairing of the upper face is slightly buckled by the compression forces, which buckling prevents the absorption of such forces by the fairing. It has, however, been found that notwithstanding this buckling the plain fairing is able to absorb thrust and consequently torsional forces.

The novel wing therefore offers the advantage that it is substantially equal in all respects to a wing with exclusively corrugated fairing, but is lighter in weight and more favorable with respect to aerodynamic conditions.

In the drawings affixed to this specification and forming part thereof a wing embodying my invention is illustrated diagrammatically by way of example.

In the drawings

Figure 1:
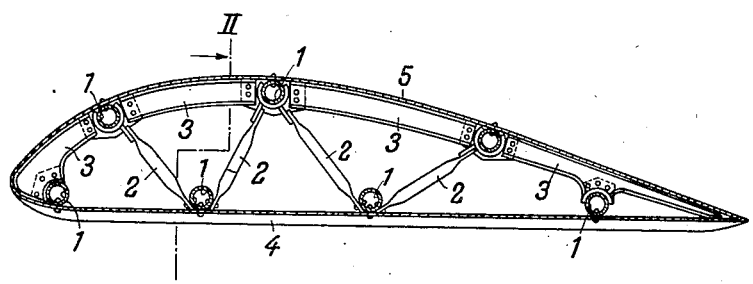
Fig. 1 is a cross section of the wing on the line I—I in Fig. 2.
Figure 2:
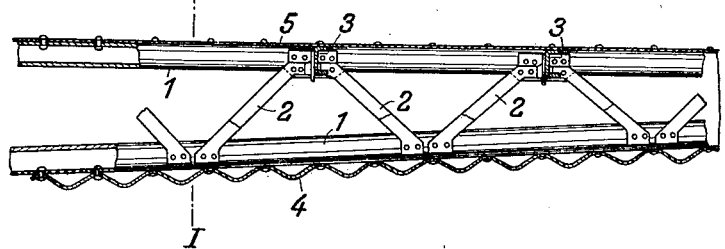
Fig. 2 is a longitudinal section of part of the wing on the line II—II in Fig. 1.

The wing is provided with the usual tubular spars 1, 1, diagonals 2, 2 and rib formers 3. 4 is a fairing of corrugated sheet metal at the lower face of the wing, which is secured directly to the lower spars 1 and in this manner forms the horizontal bracing of these spars, and 5 is a fairing of plain sheet metal which is secured to the upper spars 1 and to the rib formers 3 of the upper face.

As mentioned above, my invention may also be applied to parts of aircraft other than wings, and may also be combined with various methods of building up and bracing the wings or the like. My invention also includes providing the plain fairing only on part of the face, which part, however, is considerable as a rule, while other parts, for instance in a wing, the region of the leading edge where the curvature is strongest and the air forces are greatest, or parts on which persons walk or which for other reasons must be particularly strong, are equipped with the corrugated fairing. The lower face may be designed on similar lines. For instance regions which are subjected to small bending forces only, say at the end of the aerofoil, may be made with plain fairing, and the others with corrugations.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A plane for aircraft having a fairing of corrugated sheet metal at its lower face with its corrugations extending in the direction of the flight, and a fairing of plain sheet metal at its upper face.

2. A plane for aircraft having a fairing of corrugated sheet metal at its lower face with its corrugations extending in the direction of the flight, a fairing of plain sheet metal at its upper face, and a fairing of corrugated sheet metal replacing the plain metal at the upper face at regions which are subjected to higher local stress than the remainder of the face.

In testimony whereof I affix my signature.

HUGO JUNKERS.